United States Patent
Hu

(10) Patent No.: US 10,536,845 B2
(45) Date of Patent: Jan. 14, 2020

(54) METHOD OF UPGRADING FIRMWARE BY CONFIGURING A LOW DATA-RATE RADIO FREQUENCY (RF) MODULE USING HIGH FREQUENCY RF BANDS

(71) Applicant: Xin Hu, Berlin (DE)

(72) Inventor: Xin Hu, Berlin (DE)

(*) Notice: Subject to any disclaimer, the term of this patent is extended or adjusted under 35 U.S.C. 154(b) by 0 days.

(21) Appl. No.: 15/998,402

(22) Filed: Aug. 15, 2018

(65) Prior Publication Data

US 2019/0058990 A1  Feb. 21, 2019

Related U.S. Application Data

(60) Provisional application No. 62/545,885, filed on Aug. 15, 2017.

(51) Int. Cl.
```
H04W 8/24      (2009.01)
H04W 52/38     (2009.01)
H04W 52/02     (2009.01)
H01Q 5/30      (2015.01)
G06F 8/65      (2018.01)
H04L 29/06     (2006.01)
H04L 29/08     (2006.01)
H04W 4/80      (2018.01)
H04L 12/24     (2006.01)
```
(52) U.S. Cl.
CPC ............ H04W 8/245 (2013.01); G06F 8/65 (2013.01); H01Q 5/30 (2015.01); H04L 41/082 (2013.01); H04L 67/34 (2013.01); H04L 69/14 (2013.01); H04W 4/80 (2018.02); H04W 52/0229 (2013.01); H04W 52/38 (2013.01)

(58) Field of Classification Search
CPC .. H04W 52/0229; H04W 52/38; H04W 8/245
See application file for complete search history.

(56) References Cited

U.S. PATENT DOCUMENTS

| | | | | |
|---|---|---|---|---|
| 5,754,961 A | * | 5/1998 | Serizawa | H04B 7/26 370/343 |
| 2008/0088411 A1 | * | 4/2008 | Ghabra | B60R 25/24 340/5.64 |
| 2015/0230206 A1 | * | 8/2015 | Tabet | H04W 72/02 370/329 |
| 2019/0042227 A1 | * | 2/2019 | Sharma | G06F 8/65 |

* cited by examiner

*Primary Examiner* — Rasheed Gidado

(57) ABSTRACT

A method of upgrading firmware by configuring a low data-rate radio frequency (RF) module using high frequency RF bands utilizes at least one remote server, a mobile device, and at least one end device. The end device includes at least one activation module, a high data-rate RF module, and a microcontroller. The mobile device includes a large configuration file for upgrading the firmware and changing the configuration settings of the end device. The activation module sends a power-up command to the microcontroller for activating the high data-rate RF module. Accordingly, the high data-rate RF module forms a connection with the mobile device, whereby the mobile device sends the large configuration file to the end device. The end device executes a firmware upgrade and modifies configuration in accordance with the large configuration file.

12 Claims, 13 Drawing Sheets

US 10,536,845 B2

METHOD OF UPGRADING FIRMWARE BY CONFIGURING A LOW DATA-RATE RADIO FREQUENCY (RF) MODULE USING HIGH FREQUENCY RF BANDS

The current application claims a priority to the U.S. Provisional Patent application Ser. No. 62/545,885 filed on Aug. 15, 2017.

FIELD OF THE INVENTION

The present invention generally relates to a method of upgrading firmware by configuring a low data-rate RF module using high frequency RF bands. More specifically, the low data-rate RF module is used to selectively activate the high data-rate RF module of an end device.

BACKGROUND OF THE INVENTION

Embedded systems specialized computers operating as part of a larger electronic device. Embedded systems are ubiquitous in the modern world. Everything from a jet engine to something as simple as an electronic lock has an embedded system for monitoring and managing its vital functions. Conventionally, these computers operate in closed systems that are incapable of communicating with the outside world. However, with the advent of Internet of Things (IoT), embedded systems contained in disparate devices are starting to be internetworked together and are starting to communicate with each other. The present invention utilizes the new-found connectivity to upgrade the firmware and configuration of embedded systems.

Firmware upgrades are imperative for electronic devices used in safety critical applications, such as those found in the automotive, aerospace, and the industrial automation. Firmware upgrades can be used to fix a part of the logic that could result in the dead lock or freeze of the electronic device. Firmware updates can also be used to ensure that electronic devices are running on the most up-to-date and secure firmware releases. Failing to properly update the firmware can compromise the security of the electronic device allowing malicious users from breaking into the system and manipulating the electronic device. This can lead to devastating consequences for companies that rely on embedded electronic devices for their business.

Low data rate technologies such as low power wide area network (LPWAN) have already become the de facto standard for IoT. In the future, there will be the need to connect thousands of millions of embedded systems in everything street lights, water pipes, bikes to freight containers. The market demands a more robust, reliable and practical device management method, and end-to-end solutions.

LPWAN uses low data rate modules that can transmit over a long distance and use very low power. Low data-rate modules use regulated industrial, scientific, and medical (ISM) bands that usually limit the access of the spectrum after the previous usage and have bandwidths that are much lower than their short-range counterparts. Most importantly, they are programmed to be inactive for saving the power at the majority of time. For example, the communication between low data rate RF module and cloud can be less than 10 times a day depending on the use cases.

However, emerging solutions like using the low data rate technologies to upgrade the end devices pose hard burden on the regulated ISM bands and will jam the network when transferring the large data packets. Due to the limitation of the regulated ISM bands, the transmission of the packets will take days or weeks in ideal cases. If there is any packet lost or the integrity check is wrong, that part of the packet needs to be retransmitted, which will add more burden on the ISM bands and the whole system.

In contrast, high data-rate modules that use high bandwidths such as WLAN can transfer large data packets with relative ease. The WLAN connection is thus ideal for transmitting large data packets. However, high data-rate technologies also consume a lot of power, which is undesirable for embedded systems running on limited power. This can also be helpful in controlling vital functions of the embedded system such as firmware upgrades and changing the configuration settings.

As such, the present invention uses low data-rate packets to wake a high data-rate transceiver in an end device, to transfer firmware upgrade files from a mobile device to the end device.

DETAILED DESCRIPTION OF THE INVENTION

All illustrations of the drawings are for the purpose of describing selected versions of the present invention and are not intended to limit the scope of the present invention.

Figure 1:
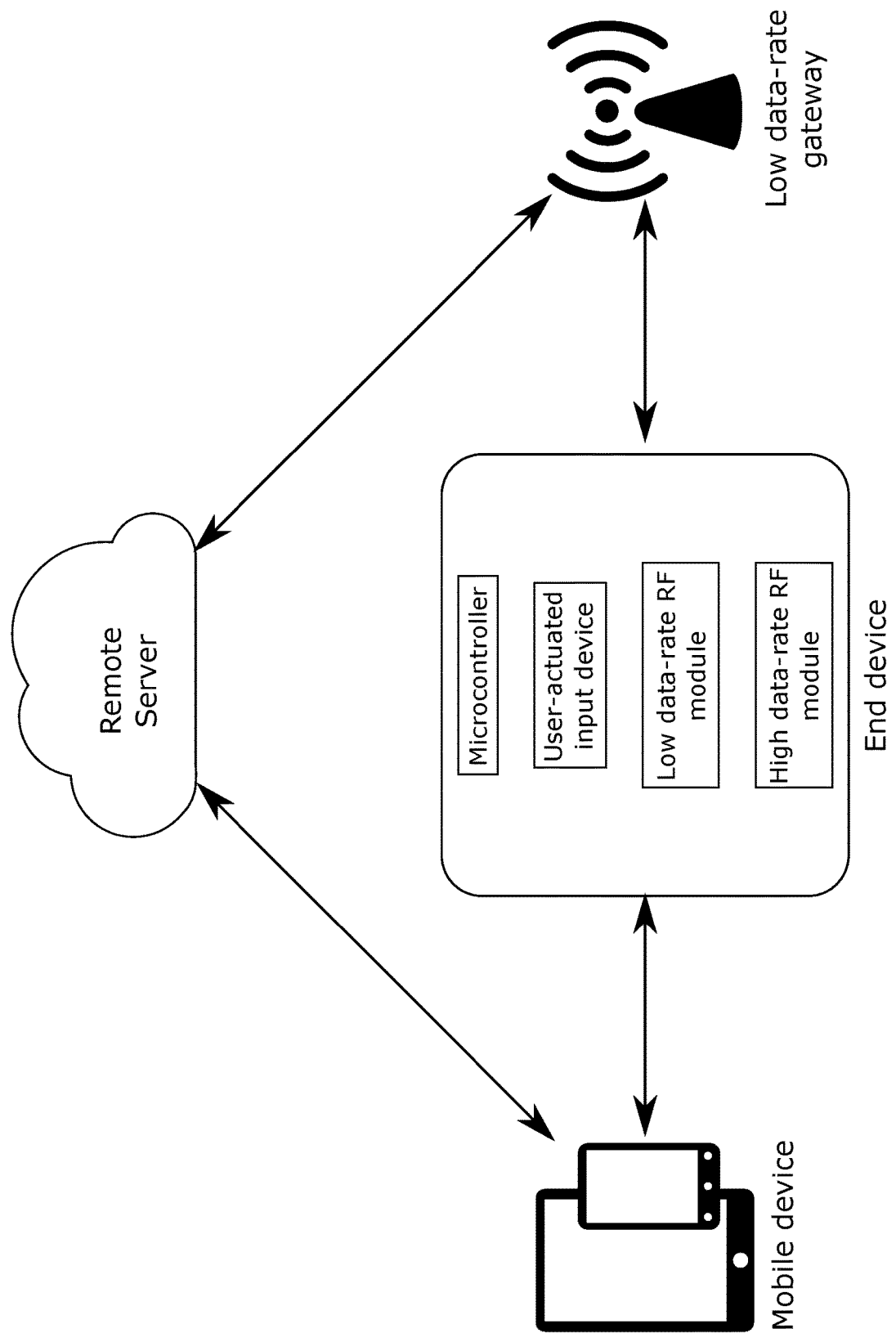
FIG. 1 is a schematic view of the present invention illustrating the communication between the mobile device, the end device, the low data-rate gateway, and the remote server.
Figure 2:
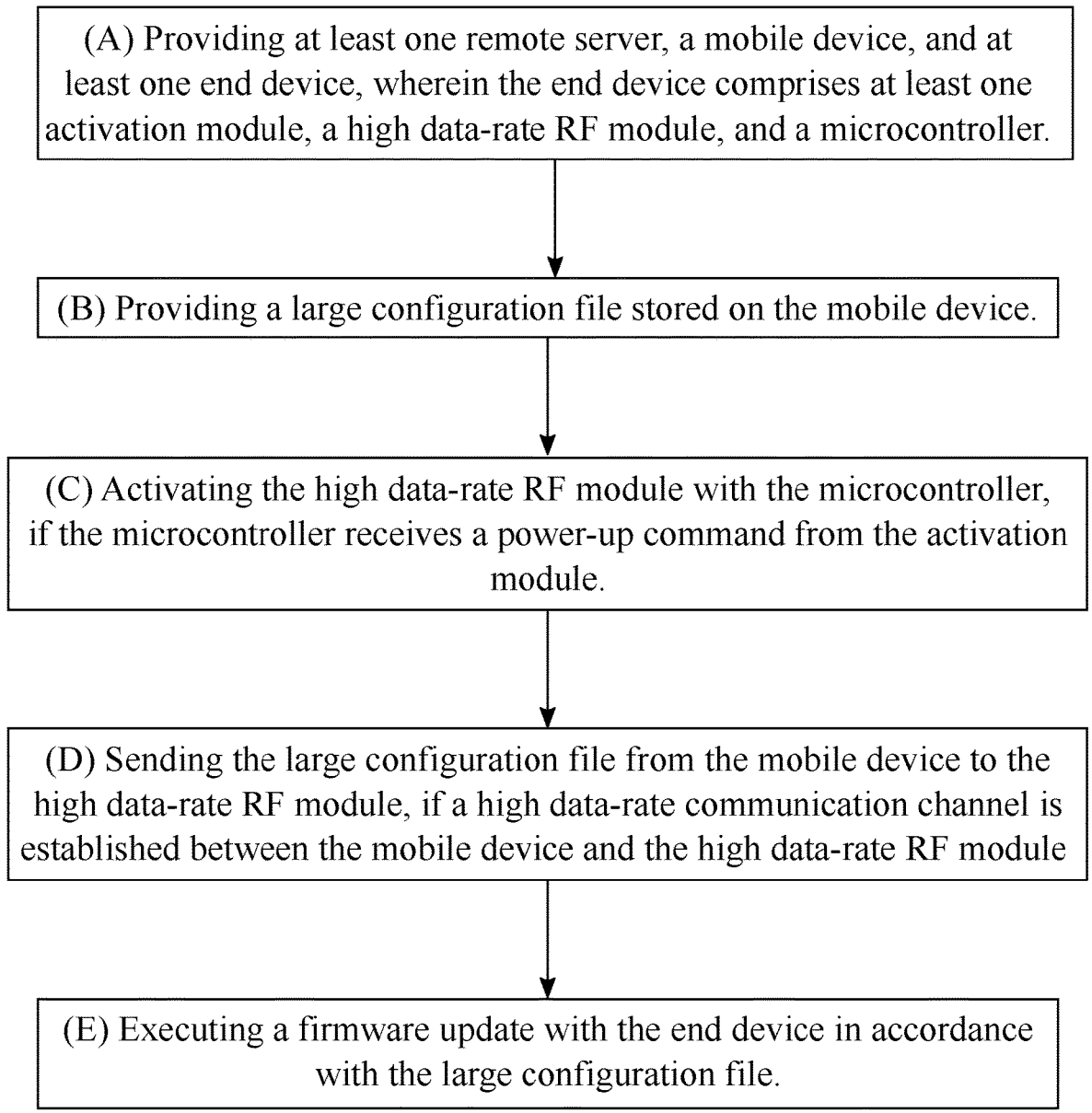
FIG. 2 is a flowchart illustrating the general process of the present invention.

Referring to FIG. 1 and FIG. 2, the present invention is a method for upgrading firmware by configuring a low data-rate RF module using high frequency RF bands. The preferred method of the present invention is provided with at least one remote server, a mobile device, and at least one end device, wherein the end device comprises at least one activation module, a high data-rate RF module, and a microcontroller (Step A).

The at least one remote server is in wireless communication with the mobile device and the at least one end device. Alternately, the mobile device may be in wireless communication with a plurality of remote servers that are internetworked together. The mobile device as herein referred to includes, but is not limited to, smartphones, laptops, desktop, personal digital assistants (PDAs), smartwatches, and the like. Similarly, the at least one end device includes, but it not limited to, embedded system with software, sensors, actuators, and networking tools for exchanging data over a network. The end device may be embedded into consumer electronics, home appliances, industrial electronics, vehicles, and other electronic devices.

In the preferred embodiment, the activation module is used to selectively activate the high data-rate RF module. In one possible embodiment, the activation module may be wirelessly activated by the remote server. As such, the activation module may comprise a wireless communication device that consumes very low power. In another possible embodiment, the activation module may be activated by a user. In this embodiment, the user must physically access the end device and actuate the activation module. Accordingly, the activation module may include a physical button or the like.

Once the activation module is activated, the high data-rate RF module is woken up to receive firmware upgrade files from the mobile device. The high data-rate RF module is used for short-range communication. In the preferred embodiment of the present invention, the high data-rate RF module is a wireless local area network (WLAN) transceiver. More specifically, the high data-rate RF module is a Bluetooth Low Energy (BLE) transceiver. Alternately, the high data-rate RF module may include, but not be limited to, Wi-Fi, near-field communication (NFC), Zigbee, and/or other high-frequency, short-range RF protocol known in the relevant arts.

The high data-rate RF module is controlled by the microcontroller. More specifically, the microcontroller takes inputs from the activation module and controls the high data-rate RF module accordingly. Further, the microcontroller can also send outputs to change and upgrade the configuration settings of the activation module. In the preferred embodiment, the microcontroller is a Bluetooth microcontroller which may work in conjunction with a main microcontroller of the end device. Alternately, the microcontroller may be the main microcontroller of the end device.

Preferably, a large configuration file stored on the mobile device is provided (Step B). The large configuration file may include the firmware upgrade and configuration settings for the end device. More specifically, the large configuration file may be used to upgrade the firmware of the microcontroller and to configure the data rates, sleeping intervals, and the read status of the activation module. In one embodiment, the large configuration file is sent to the mobile device via the remote server. The mobile device then transmits the files to the high data-rate RF module of the end device. In another possible embodiment, the large configuration file may be pre-stored on the mobile device.

To save power, the high data-rate RF module is kept idle until needed. The activation module is thus used to wake the high data-rate RF module when a firmware upgrade is available from the mobile device. Thus, prior to transmitting the large configuration file to the end device, the activation module must be activated by the user or the remote server. Accordingly, if the microcontroller receives a power-up command from the activation module, the microcontroller activates the high data-rate RF module (Step C). The power-up command may be sent wirelessly via the remote server or may be generated physically by the user. Once the activation module sends the power-up command to the high data-rate RF module, the high data-rate RF module tries to connect to the mobile device by transmitting high data-rate signals. Alternately, the high data-rate RF module may instead search for high data-rate signals generated by the mobile device.

The large configuration file is transmitted, once the high data-rate RF module connects to the mobile device. More specifically, if a high data-rate communication channel is established between the mobile device and the high data-rate RF module, the large configuration file is sent from the mobile device to the high data-rate RF module (Step D). The high data-rate communication channel may be established once the mobile device detects high data-rate signals generated by the high data-rate RF module. Alternately, the high data-rate RF module may detect high data-rate signals transmitted by the mobile device and send a confirmation to the mobile device. The high data-rate communication channel utilizes high frequency and high bandwidth to rapidly transmit the large configuration file from the mobile device to the end device. However, if the high data-rate RF module doesn't detect the mobile device after a specified search period, the microcontroller is programmed to deactivate the high data-rate RF module. The length of the specified search period is one of the attributes that is modified by the large configuration file. In the preferred embodiment of the present invention, the large configuration file stored in the onboard memory of the end device. The preferred embodiment of the present invention utilizes Flash memory as the onboard memory. The memory map of the flash drive consists of a bootloader and a firmware stack. The firmware upgrade and configuration method for the low data rate RF module is mainly performed at the firmware stack. Alternately, any other suitable computer-readable storage medium may be used as the onboard memory.

Once successfully downloaded and stored, the microcontroller can read from the large configuration file. Accordingly, the end device executes a firmware upgrade in accordance with the large configuration file (Step E). Preferably, the firmware upgrade reconfigures the Bluetooth microcontroller of the end device. The firmware upgrade is used to fix bugs in the firmware that could result in dead lock or freeze the end device. Additionally, the firmware upgrade may include security upgrades that prevent others from breaking into the system and manipulating the end device. In the preferred embodiment, firmware upgrade is executed on the firmware of the Bluetooth microcontroller. In alternate embodiments, the firmware upgrade may be executed on the main microcontroller of the end device. Additionally, the large configuration file is also used to reconfigure the high data-rate RF module and the activation module. For example, the large configuration file may be used to change the specified search time of the high data-rate RF module.

Figure 3:
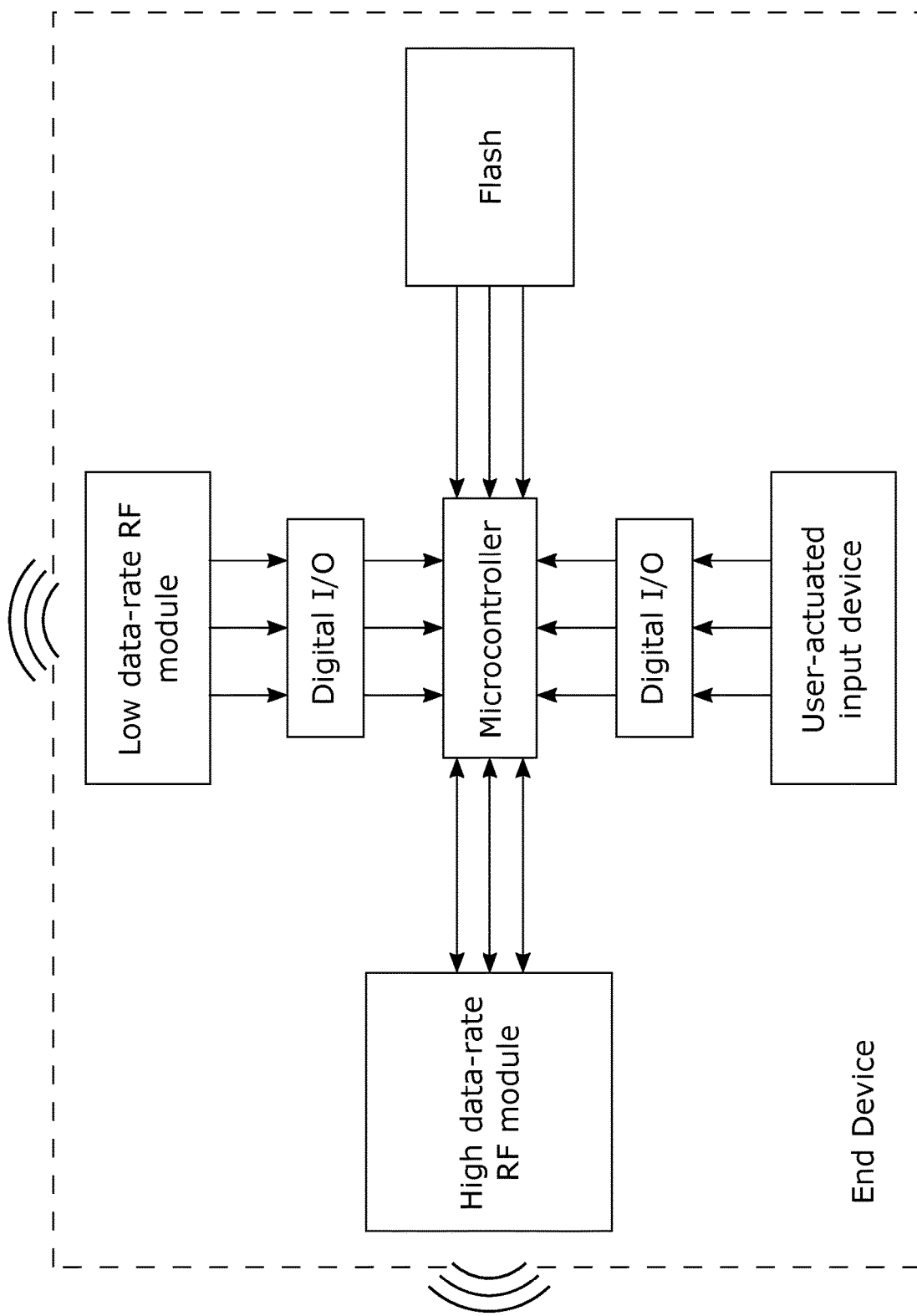
FIG. 3 is schematic view of the end device and the subcomponents of the end device.
Figure 4:
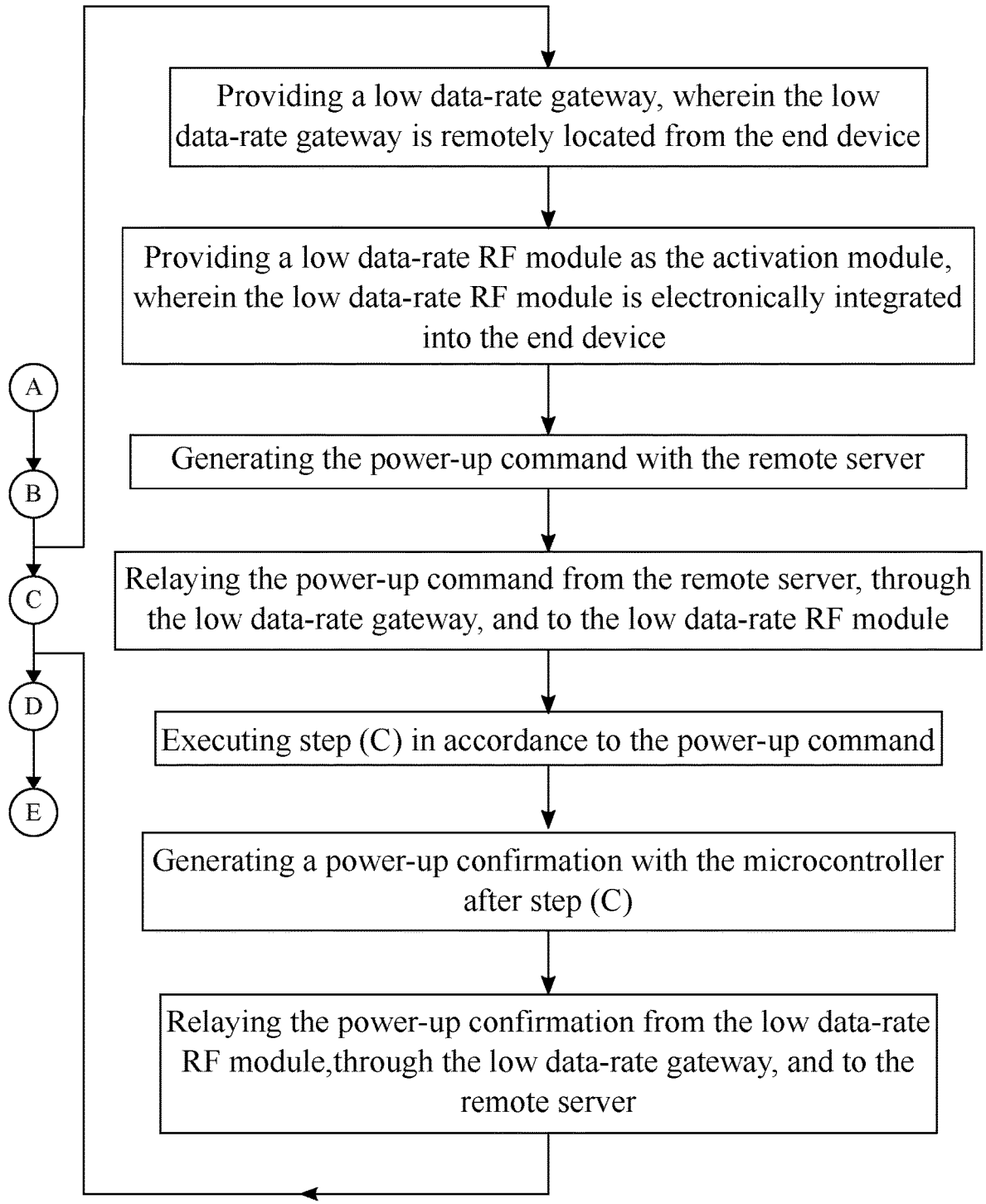
FIG. 4 is a subprocess for activating the high data-rate RF module with the low data-rate RF module.

Referring to FIG. 3 and FIG. 4, in one possible embodiment, the activation module may be wirelessly activated by the remote server. Accordingly, a low data-rate gateway and a low data-rate RF module as the activation module is provided, wherein the low data-rate gateway is remotely located from the end device, and wherein the low data-rate RF module is electronically integrated into the end device. Preferably, the low data-rate gateway refers to a base station located at a distance from the end device. More specifically, the low data-rate gateway may comply to LoRaWAN or SigFox protocols. Alternately, the low data-rate gateway may be a cellular base station. In contrast, the low data-rate RF module is contained in the end device and may be physically wired to the microcontroller.

The low data-rate RF module is used for long-range communication. Accordingly, the low data-rate RF module enables the end device to communicate with the low data-rate gateway and the remote server. The preferred low data-rate RF module uses regulated industrial, scientific, and medical (ISM) radio bands that usually limit access of the spectrum after previous usage, with bandwidths that are much lower than their short-range counterparts. Additionally, the low data-rate RF module is programmed to be inactive most of the time to save power. As a result, the present invention is designed to use low data-rate RF module to activate the high data-rate RF module to transmit and receive high data-rate signals from the remote server. The preferred low data-rate RF module may be a low powered wide area network (LPWAN) transceiver. Preferably, the low data-rate RF module runs on regulated ISM frequency bands of 433 megahertz (MHz), 863-870 MHz, and 902-928 MHz with protocols like Sigfox and LoraWAN.

Figure 5:
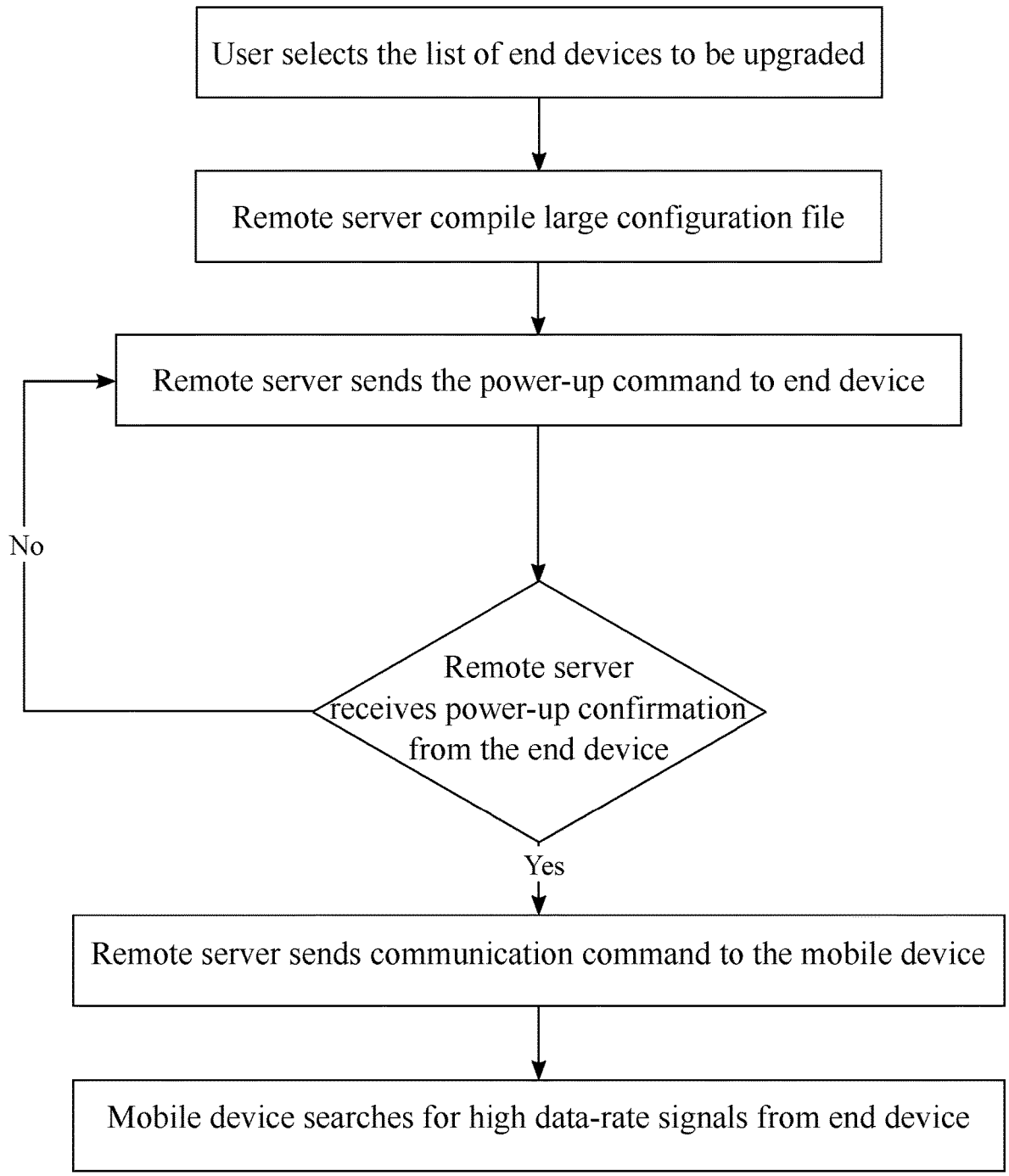
FIG. 5 is a flowchart for establishing communication between the mobile device and the end device.

Referring to FIG. 4 and FIG. 5, in the preferred implementation, the low data-rate gateway is used to ping and wake the end device when a firmware upgrade is available. To this end, the remote server generates a power-up command with the remote server. The power-up command is then relayed from the remote server, through the low data-rate gateway, and to the low data-rate RF module. In the preferred embodiment, a single low data-rate gateway communicates with the end device. However, in alternate embodiments, a plurality of low data-rate gateways may communicate with the end device. In such an embodiment, the remote server may relay the power-up command through the plurality of low data-rate gateways.

Once the power-up command is received by the low data-rate RF module of the end device, the low data-rate RF module notifies the microcontroller. Resultantly, Step (C) is executed in accordance to the power-up command. More specifically, the microcontroller activates the high data-rate RF module to send high data-rate signals to the mobile device. Alternately, the microcontroller may activate the high data-rate RF module to receive high data-rate signals from the mobile device. After activating the high data-rate RF module, the end device sends an acknowledgement to the remote server. More specifically, the microcontroller generates a power-up confirmation after Step (C). The power-up confirmation notifies the remote server that the end device is actively searching for high data-rate signals from the mobile device. Accordingly, the power-up confirmation is relayed from the low data-rate RF module, through the low data-rate gateway, and to the remote server. If the end device fails to send the power-up confirmation to the remote server, remote server is programmed to keep transmitting the power-up command with the low data-rate gateway. This loop may be ended by the user of the remote server.

Figure 6:
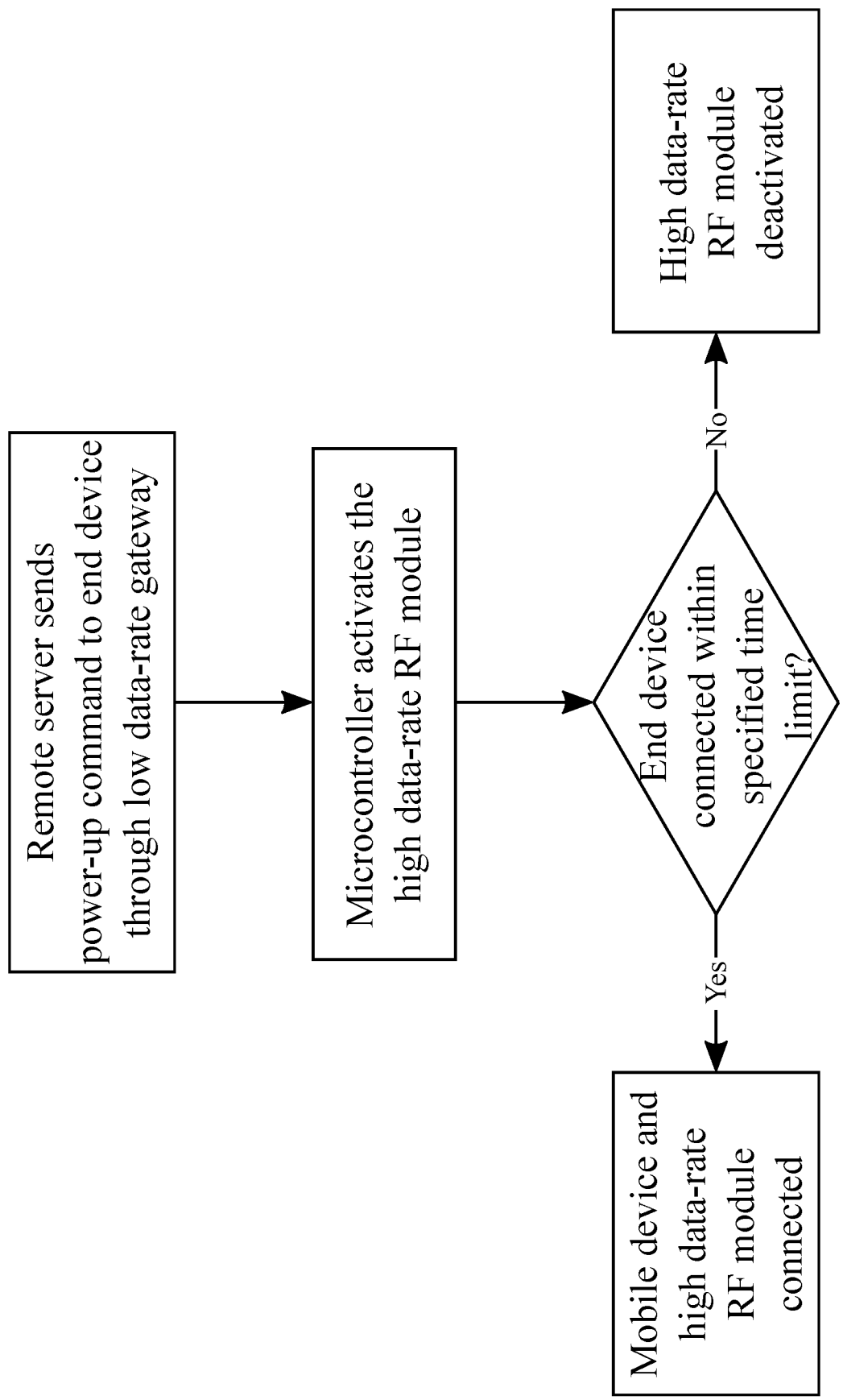
FIG. 6 is a flowchart illustrating the conditions for connecting the end device to the high data-rate RF module.
Figure 7:
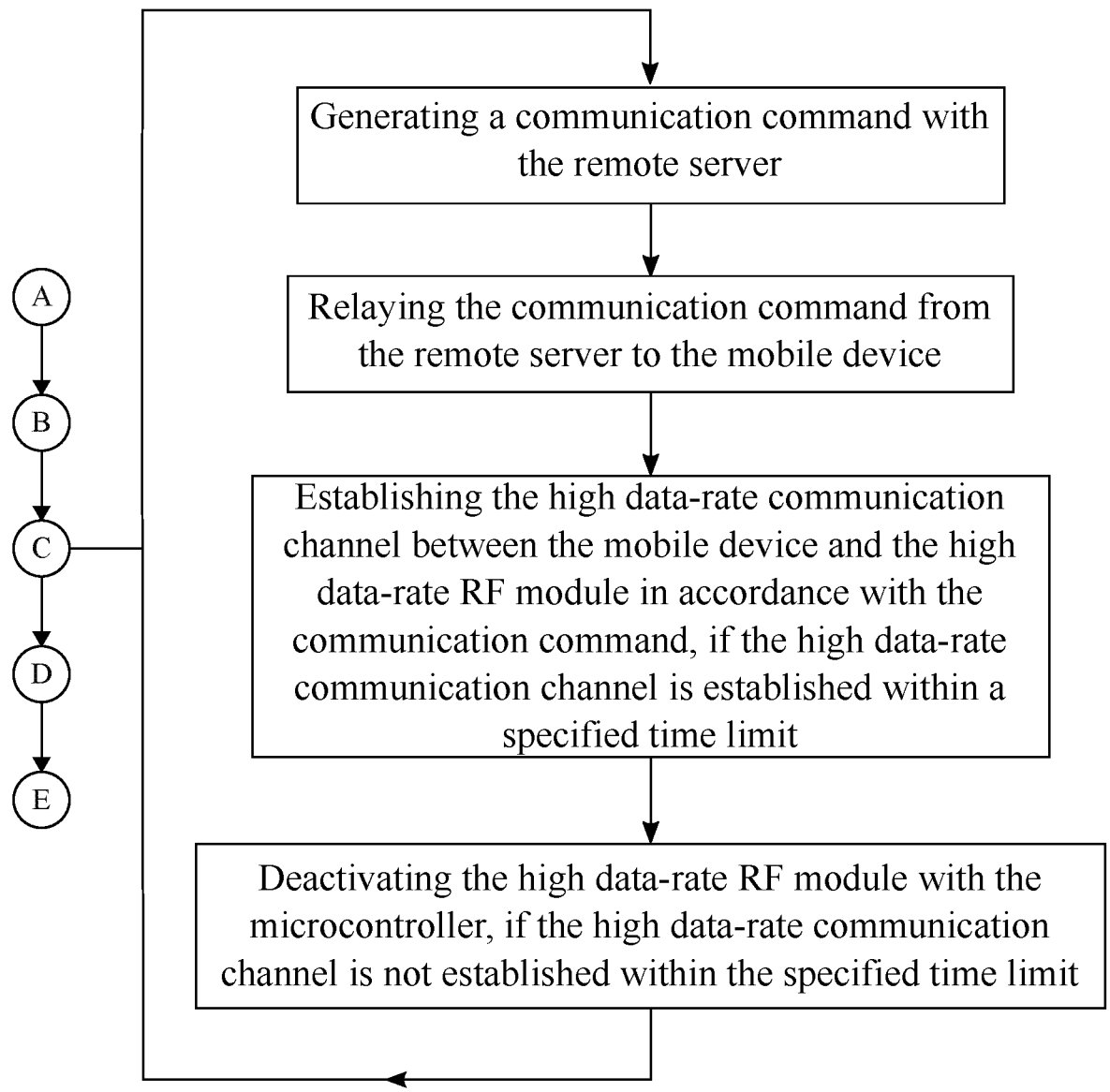
FIG. 7 is a subprocess for generating a communication command with the remote server to the mobile device.

Referring to FIG. 6 and FIG. 7, after receiving the power-up confirmation from the end device, the remote server prepares the large configuration file for the mobile device. As such, the remote serve generates a communication command. Resultantly, the communication command is relayed from the remote server to the mobile device. The communication command may comprise the large configuration file as well as the confirmation that the end device is ready to receive the large configuration file. The firmware and its manifest are stored in the remote server. The user specifies the version of the firmware for the end device. The firmware, along with the configuration settings such as the high data-rate RF module uptime, is compiled into the large configuration file and sent to the mobile device. This causes the mobile device to attempt to connect to the end device.

In the preferred embodiment, the end device attempts to connect to the mobile device by transmitting high-data rate signals from the high data-rate RF module. Further, the microcontroller is programmed to deactivate the high data-rate RF module if the mobile device is not detected within a specified time limit, such as 1 hour. As such, if the high data-rate communication channel is established within a specified time limit, the high data-rate communication channel is established between the mobile device and the high data-rate RF module in accordance with the communication command. If the high data-rate communication channel is not established within the specified time limit, the microcontroller deactivates the high data-rate RF module. More specifically, if the high data-rate RF module fails to connect to the mobile device after a specified search time limit, the microcontroller is programmed to deactivate the high data-rate RF module. The specified time limit is one of the attributes that can be modified in accordance to the large configuration file.

Figure 8:
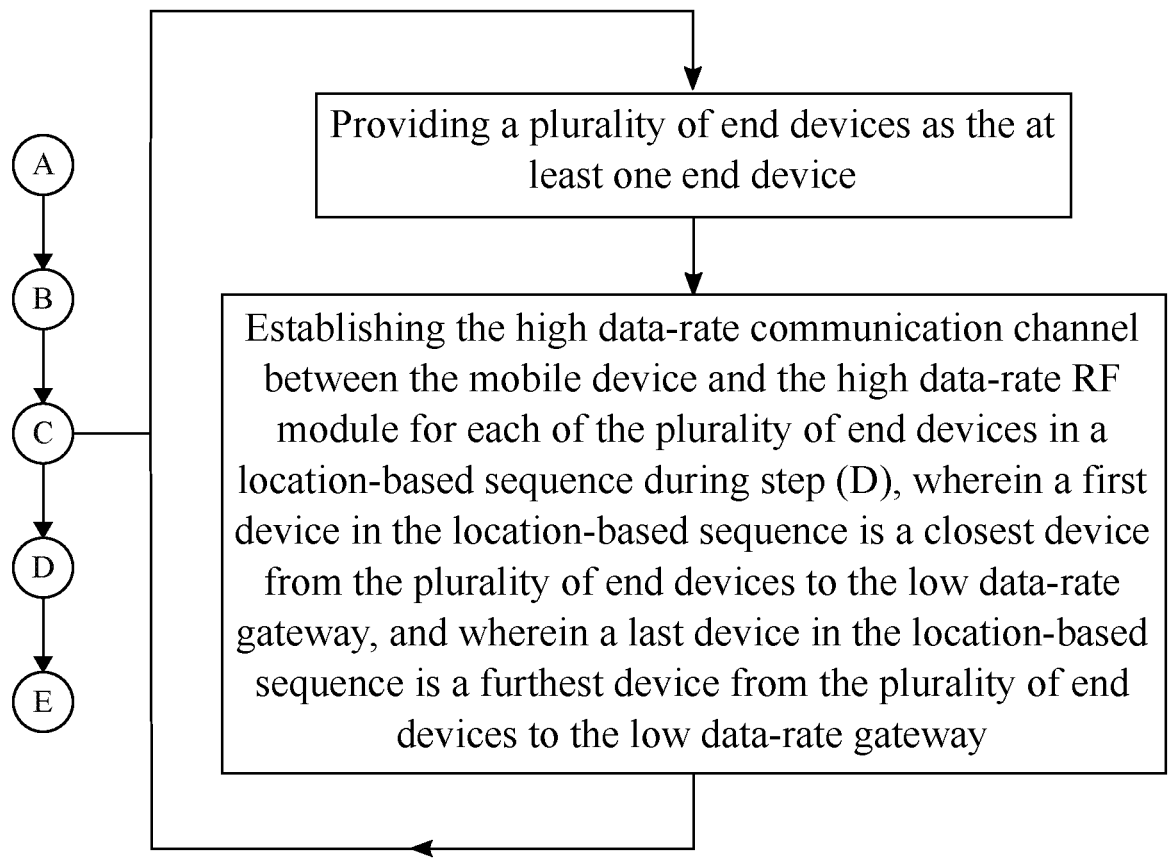
FIG. 8 is a subprocess for establishing communication with a plurality of end devices.

Referring to FIG. 8, the present invention may also be used to upgrade more than one end devices simultaneously. As such, a plurality of end devices is provided as the at least one end device. In this embodiment, the remote server wakes and receives confirmation from the plurality of end devices through the same low data-rate gateway. More specifically, the high data-rate communication channel between the mobile device and the high data-rate RF module for each of the plurality of end devices is established in a location-based sequence after Step (D), wherein a first device in the location-based sequence is a closest device from the plurality of end devices to the low data-rate gateway, and wherein a last device in the location-based sequence is a furthest device from the plurality of end devices to the low data-rate gateway. This causes the mobile device to establish the high data-rate communication channel and the execute the firmware upgrade of the closest end device first. The mobile device then sequentially performs the firmware upgrade of the plurality of end devices from the closest device to the last device, wherein the last device is furthest away from the mobile device.

Figure 9:
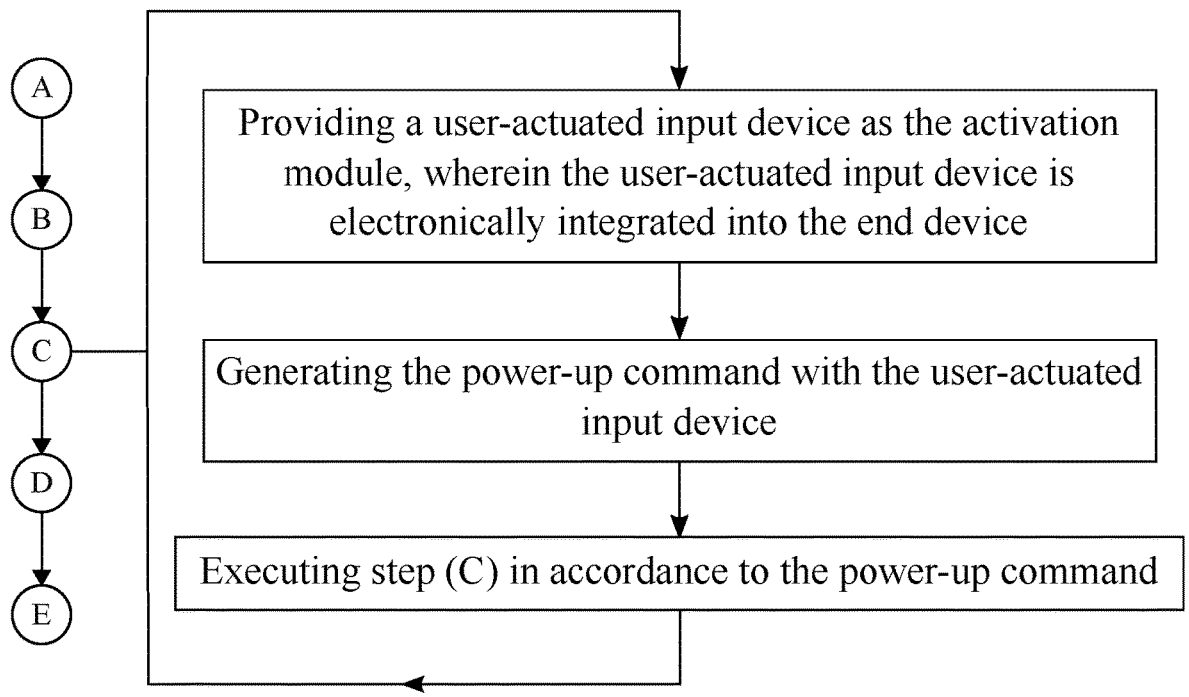
FIG. 9 is a subprocess for using the user-actuated input device as the activation module.

Referring to FIG. 9, in another possible embodiment of the present invention, the activation module must be physically actuated by the user. As such, a user-actuated input device is provided as the activation module, wherein the user-actuated input device is electronically integrated into the end device. The user-actuated input is used to provide physical access to the users. The user-actuated input device may be a button, a universal serial bus (USB) port, and/or a universal asynchronous receiver-transmitter (UART), which will communicate with the microcontroller. Users must thus get physical access to the device to activate the high data-rate RF module. Accordingly, the user-actuated input device generates the power-up command. The power-up command is preferably sent to the microcontroller, which activates the high data-rate RF module accordingly. Resultantly, Step (C) is executed in accordance to the power-up command. In the preferred embodiment, the high data-rate RF module starts to transmit high data-rate signals to the mobile device. The high data-rate communication channel is established once the mobile device detects the high data-rate signals. Alternately, the high data-rate RF module may instead search for high data-rate signals from the mobile device. As such, the high data-rate communication channel is only established if the high data-rate RF module detects the high data-rate signals.

Figure 10:
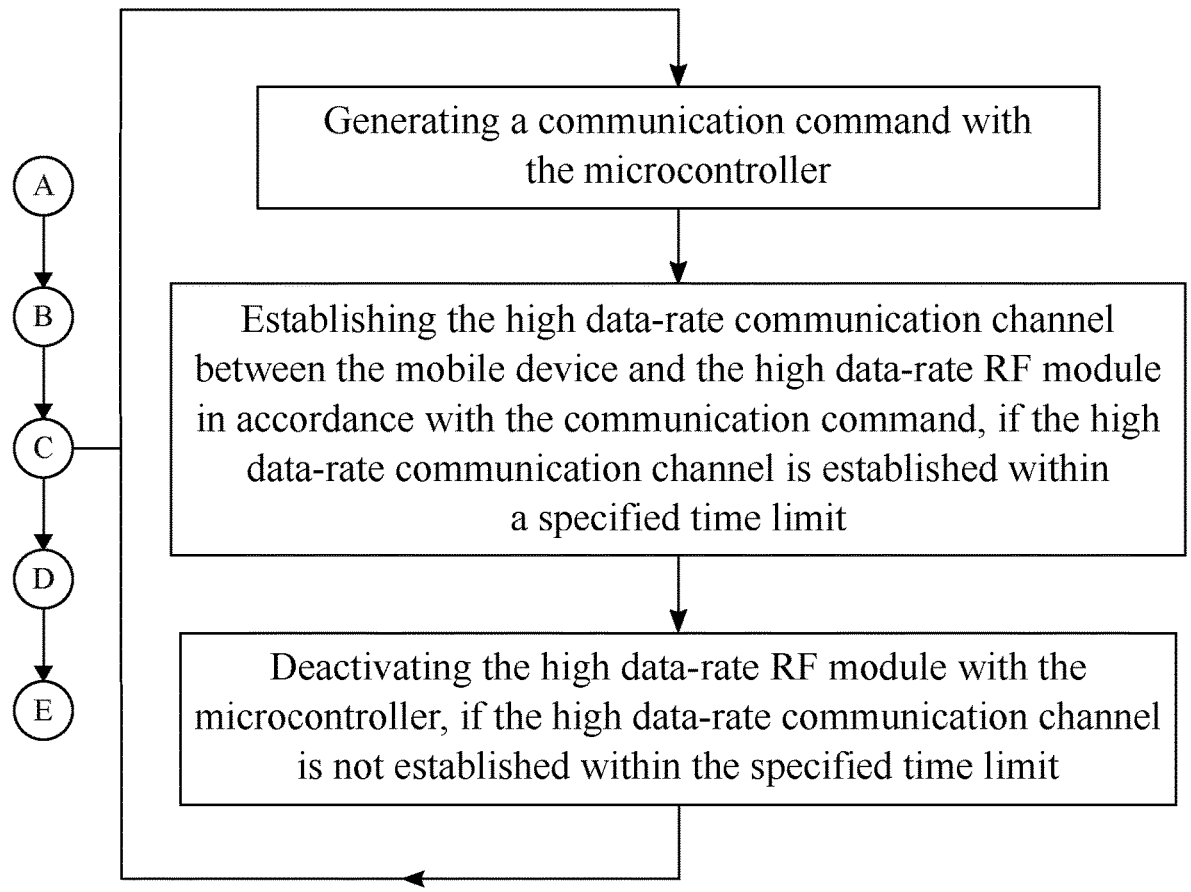
FIG. 10 is a subprocess for activating the high data-rate RF module with the user-actuated input device.
Figure 11:
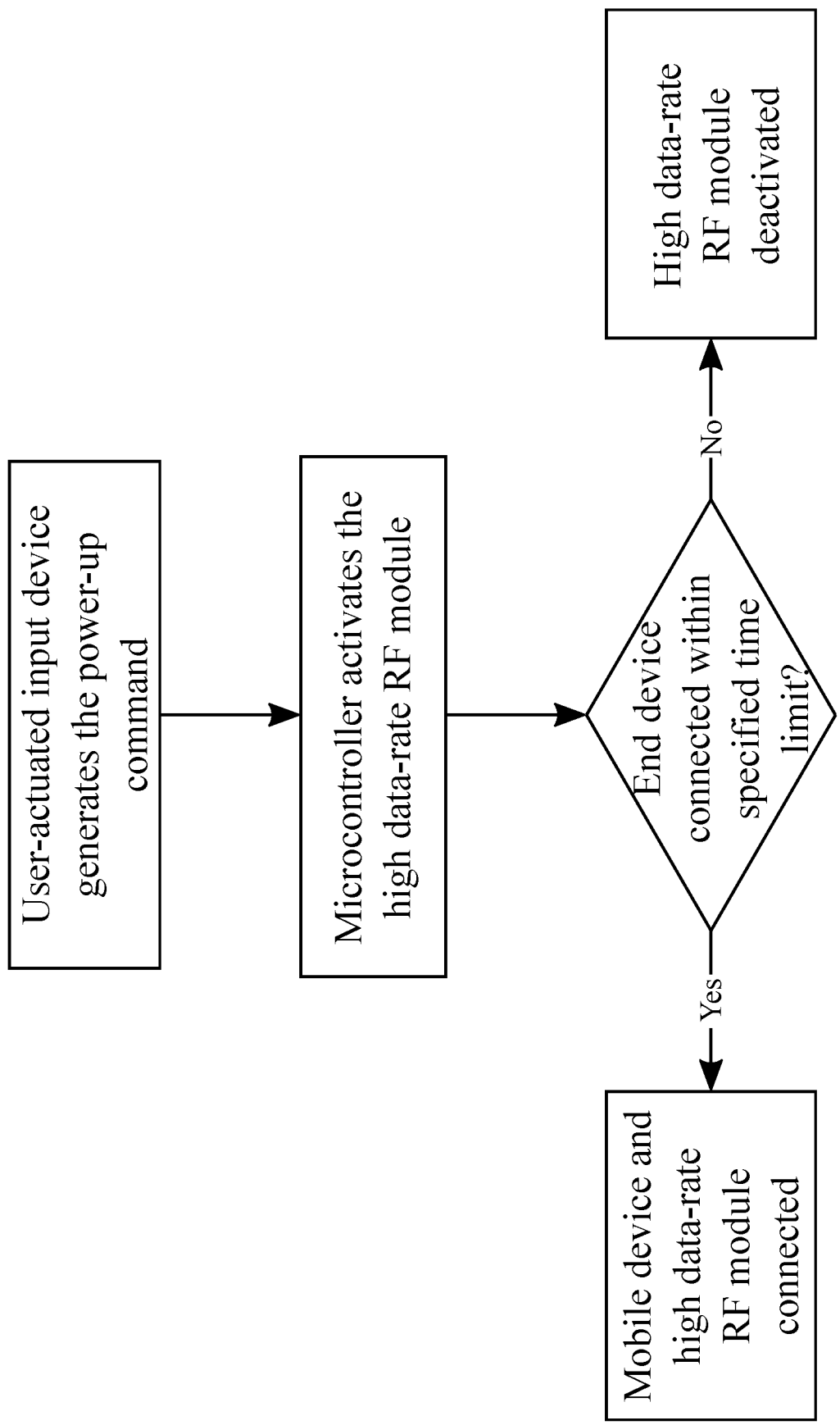
FIG. 11 is a flowchart for connecting the end device with the mobile device.

Referring to FIG. 10 and FIG. 11, in one possible embodiment, once the high data-rate communication channel is established, the microcontroller generates a communication command. If the high data-rate communication channel is established within a specified time limit, the high data-rate communication channel is established between the mobile device and the high data-rate RF module in accordance with the communication command. Alternately, if the high data-rate communication channel is not established within the specified time limit, the microcontroller deactivates the high data-rate RF module. More specifically, if the high data-rate RF module fails to connect to the mobile device after a specified time limit, the microcontroller is programmed to deactivate the high data-rate RF module. The specified search time limit is one of the attributes that can be modified in accordance to the large configuration file.

Figure 12:
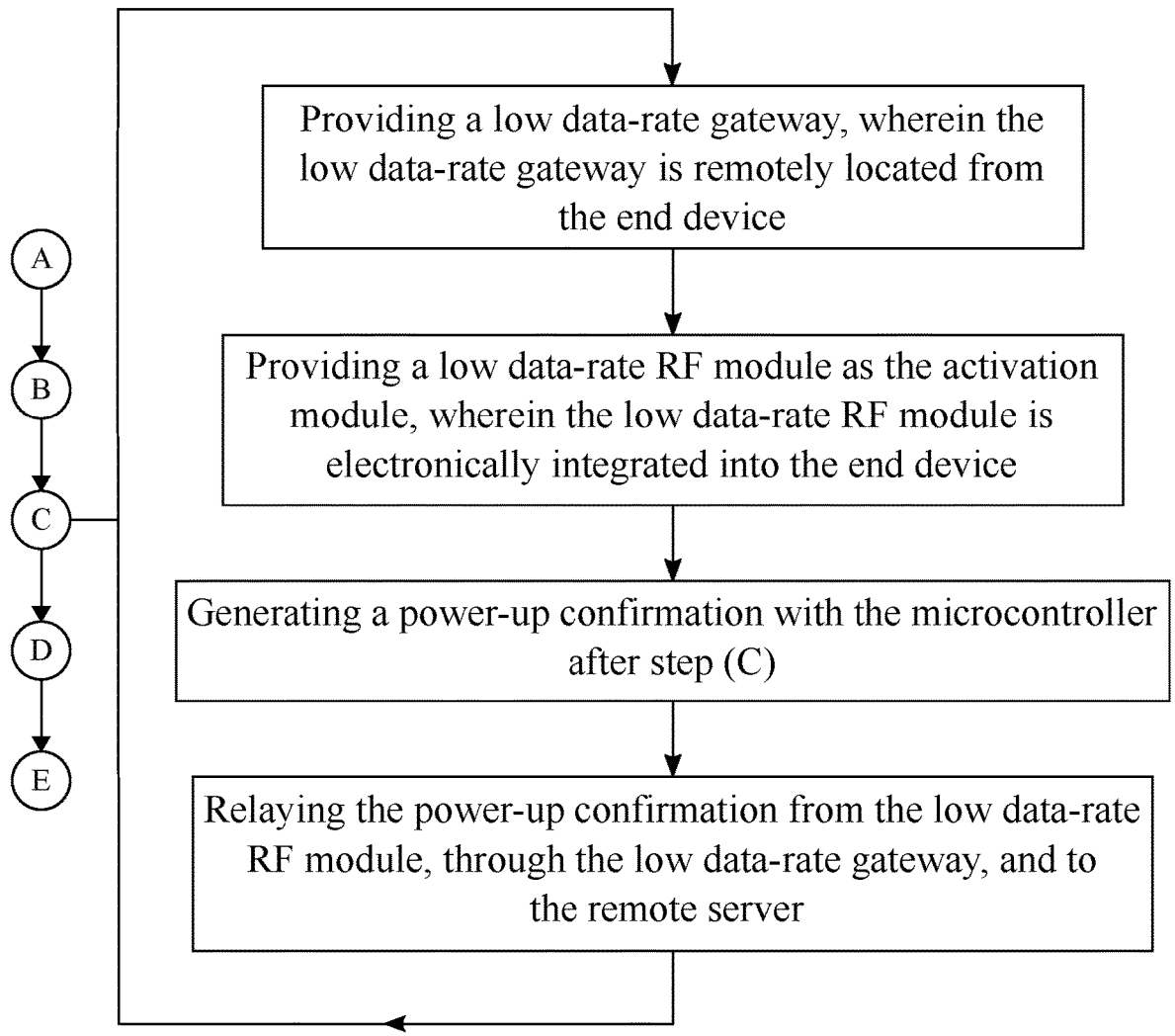
FIG. 12 is a subprocess for generating power-up confirmation with the user-actuated input device.

Referring to FIG. 12, in another possible embodiment, the user-actuated input device may also be responsible for triggering the power-up confirmation with the microcontroller. This may cause the remote server to generate a communication command and send the communication command to the mobile device. The mobile device then starts searching for high data-rate signals from the high data-rate RF module of the end device, to establish the high data-rate communication channel. Accordingly, a low data-rate gateway is provided, wherein the low data-rate gateway is remotely located from the end device. Further, a low data-rate RF module is provided as the activation module, wherein the low data-rate RF module is electronically integrated into the end device. The microcontroller is preferably programmed to activate the low data-rate RF module when the user actuates the user-actuated input device. As such, the microcontroller generates the power-up confirmation after Step (C). The low data-rate RF module then transmits power-up confirmation to the remote server in the form of low data-rate packets. Accordingly, the power-up confirmation is relayed from the low data-rate RF module, through the low data-rate gateway, to the remote server.

In yet another embodiment, the mobile device is used to upgrade a plurality of end devices, wherein each end device comprises a user-actuated input device. In this embodiment, the user-actuated input device is used to activate high data-rate RF module in each end device. This enables the mobile device to upgrade the firmware of the plurality of end devices simultaneously, in accordance to the large configuration file.

When the user actuates the user-actuated input device, the end device may signal the readiness to receive the firmware upgrade by flashing an LED light. However, if the end device doesn't detect the mobile device after a specified time limit, the microcontroller deactivates the high data-rate RF module.

Figure 13:
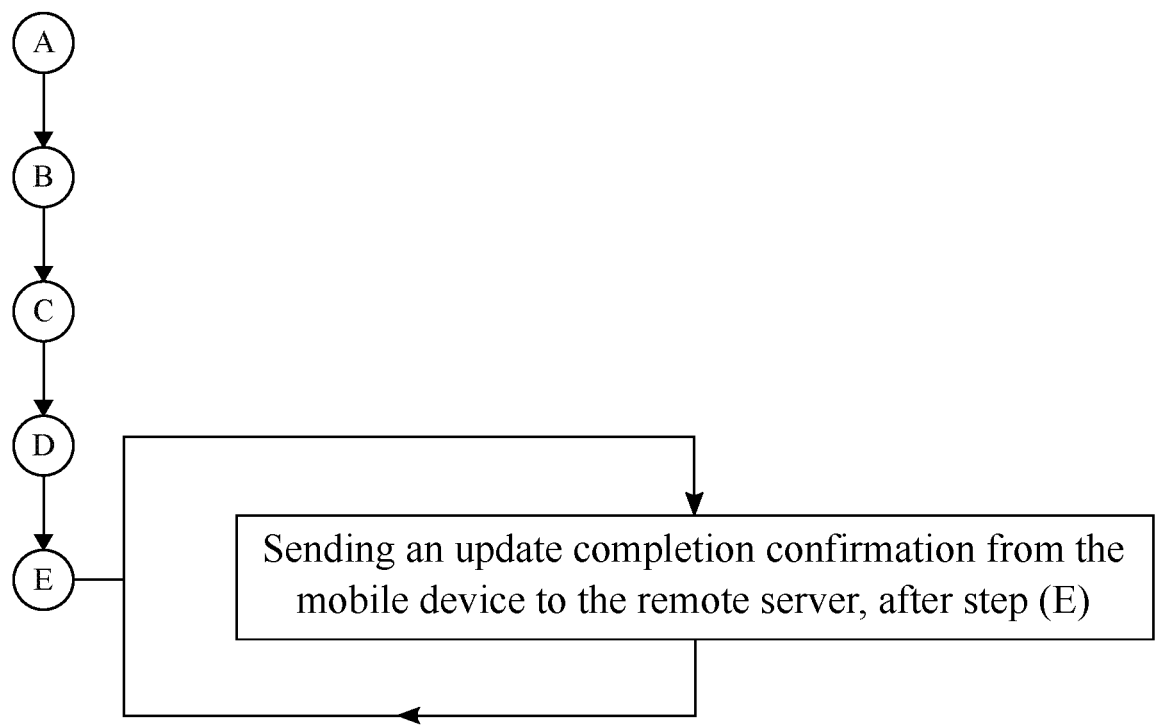
FIG. 13 is a subprocess for sending an update completion confirmation from the mobile device to the remote server.

Referring to FIG. 13, preferably, once the mobile device successfully performs the firmware upgrade of the end device, the mobile device sends a message to the remote server of the successful upgrade. As such, the mobile device sends an update completion confirmation to the end device, after Step (E).

Although the invention has been explained in relation to its preferred embodiment, it is to be understood that many other possible modifications and variations can be made without departing from the spirit and scope of the invention as hereinafter claimed.

What is claimed is:

1. A method of upgrading firmware by configuring a low data-rate radio frequency (RF) module using high frequency RF bands, the method comprises the steps of:
    (A) providing at least one remote server, a mobile device, and at least one end device, wherein the end device comprises at least one activation module, a high data-rate RF module, and a microcontroller;
    (B) providing a large configuration file stored on the mobile device;
    providing a low data-rate gateway, wherein the low data-rate gateway is remotely located from the end device;
    providing a low data-rate RF module as the activation module, wherein the low data-rate RF module is electronically integrated into the end device;
    generating a power-up command with the remote server;
    relaying the power-up command from the remote server, through the low data-rate gateway, and to the low data-rate RF module;
    (C) activating the high data-rate RF module with the microcontroller, if the microcontroller receives the power-up command from the activation module;
    generating a power-up confirmation with the microcontroller;
    relaying the power-up confirmation from the low data-rate RF module, through the low data-rate gateway, and to the remote server;
    (D) sending the large configuration file from the mobile device to the high data-rate RF module, if a high data-rate communication channel is established between the mobile device and the high data-rate RF module; and
    (E) executing a firmware upgrade with the end device in accordance with the large configuration file.

2. The method of upgrading firmware by configuring a low data-rate RF module using high frequency RF bands, the method as claimed in claim 1 comprises the steps of:
    generating a communication command with the remote server;
    relaying the communication command from the remote server to the mobile device;
    establishing the high data-rate communication channel between the mobile device and the high data-rate RF module in accordance with the communication command, if the high data-rate communication channel is established within a specified time limit; and
    deactivating the high data-rate RF module with the microcontroller, if the high data-rate communication channel is not established within the specified time limit.

3. The method of upgrading firmware by configuring a low data-rate RF module using high frequency RF bands, the method as claimed in claim 2 comprises the steps of:
    providing a plurality of end devices as the at least one end device; and
    establishing the high data-rate communication channel between the mobile device and the high data-rate RF module for each of the plurality of end devices in a location-based sequence during step (D), wherein a first device in the location-based sequence is a closest device from the plurality of end devices to the low data-rate gateway, and wherein a last device in the location-based sequence is a furthest device from the plurality of end devices to the low data-rate gateway.

4. The method of upgrading firmware by configuring a low data-rate RF module using high frequency RF bands, the method as claimed in claim 1 comprises the steps of:
    providing a user-actuated input device as the activation module, wherein the user-actuated input device is electronically integrated into the end device;
    generating the power-up command with the user-actuated input device; and
    executing step (C) in accordance to the power-up command.

5. The method of upgrading firmware by configuring a low data-rate RF module using high frequency RF bands, the method as claimed in claim 4 comprises the steps of:
  generating a communication command with the microcontroller;
  establishing the high data-rate communication channel between the mobile device and the high data-rate RF module in accordance with the communication command, if the high data-rate communication channel is established within a specified time limit; and
  deactivating the high data-rate RF module with the microcontroller, if the high data-rate communication channel is not established within the specified time limit.

6. The method of upgrading firmware by configuring a low data-rate RF module using high frequency RF bands, the method as claimed in claim 1 comprises the step of:
  sending an upgrade completion confirmation from the mobile device to the remote server, after step (E).

7. A method of upgrading firmware by configuring a low data-rate radio frequency (RF) module using high frequency RF bands, the method comprises the steps of:
  (A) providing at least one remote server, a mobile device, and at least one end device, wherein the end device comprises at least one activation module, a high data-rate RF module, and a microcontroller;
  (B) providing a large configuration file stored on the mobile device;
  providing a low data-rate gateway, wherein the low data-rate gateway is remotely located from the end device;
  providing a low data-rate RF module as the activation module, wherein the low data-rate RF module is electronically integrated into the end device;
  generating a power-up command with the remote server;
  relaying the power-up command from the remote server, through the low data-rate gateway, and to the low data-rate RF module;
  (C) activating the high data-rate RF module with the microcontroller, if the microcontroller receives the power-up command from the activation module;
  generating a power-up confirmation with the microcontroller;
  relaying the power-up confirmation from the low data-rate RF module, through the low data-rate gateway, and to the remote server;
  (D) sending the large configuration file from the mobile device to the high data-rate RF module, if a high data-rate communication channel is established between the mobile device and the high data-rate RF module;
  (E) executing a firmware upgrade with the end device in accordance with the large configuration file; and
  (F) sending an upgrade completion confirmation from the mobile device to the remote server, after step (E).

8. The method of upgrading firmware by configuring a low data-rate RF module using high frequency RF bands, the method as claimed in claim 7 comprises the steps of:
  generating a communication command with the remote server;
  relaying the communication command from the remote server to the mobile device;
  establishing the high data-rate communication channel between the mobile device and the high data-rate RF module in accordance with the communication command, if the high data-rate communication channel is established within a specified time limit; and
  deactivating the high data-rate RF module with the microcontroller, if the high data-rate communication channel is not established within the specified time limit.

9. The method of upgrading firmware by configuring a low data-rate RF module using high frequency RF bands, the method as claimed in claim 8 comprises the steps of:
  providing a plurality of end devices as the at least one end device; and
  establishing the high data-rate communication channel between the mobile device and the high data-rate RF module for each of the plurality of end devices in a location-based sequence during step (D), wherein a first device in the location-based sequence is a closest device from the plurality of end devices to the low data-rate gateway, and wherein a last device in the location-based sequence is a furthest device from the plurality of end devices to the low data-rate gateway.

10. The method of upgrading firmware by configuring a low data-rate RF module using high frequency RF bands, the method as claimed in claim 7 comprises the steps of:
  providing a user-actuated input device as the activation module, wherein the user-actuated input device is electronically integrated into the end device;
  generating the power-up command with the user-actuated input device; and
  executing step (C) in accordance to the power-up command.

11. The method of upgrading firmware by configuring a low data-rate RF module using high frequency RF bands, the method as claimed in claim 7 comprises the steps of:
  providing a user-actuated input device as the activation module, wherein the user-actuated input device is electronically integrated into the end device;
  generating the power-up command with the user-actuated input device; and
  executing step (C) in accordance to the power-up command.

12. The method of upgrading firmware by configuring a low data-rate RF module using high frequency RF bands, the method as claimed in claim 11 comprises the steps of:
  generating a communication command with the microcontroller;
  establishing the high data-rate communication channel between the mobile device and the high data-rate RF module in accordance with the communication command, if the high data-rate communication channel is established within a specified time limit; and
  deactivating the high data-rate RF module with the microcontroller, if the high data-rate communication channel is not established within the specified time limit.

* * * * *